US012505730B2

(12) United States Patent
Kessler et al.

(10) Patent No.: US 12,505,730 B2
(45) Date of Patent: Dec. 23, 2025

(54) VENT ALARM WITH PROTECTIVE COVER

(71) Applicants: William Kessler, Hopewell Junction, NY (US); Raymond Anthony Joao, Yonkers, NY (US)

(72) Inventors: William Kessler, Hopewell Junction, NY (US); Raymond Anthony Joao, Yonkers, NY (US)

( * ) Notice: Subject to any disclaimer, the term of this patent is extended or adjusted under 35 U.S.C. 154(b) by 40 days.

(21) Appl. No.: 18/412,738

(22) Filed: Jan. 15, 2024

(65) Prior Publication Data

US 2024/0296732 A1 Sep. 5, 2024

Related U.S. Application Data

(60) Provisional application No. 63/449,633, filed on Mar. 3, 2023.

(51) Int. Cl.
*G08B 21/18* (2006.01)
*G08B 3/10* (2006.01)

(52) U.S. Cl.
CPC ............. *G08B 21/182* (2013.01); *G08B 3/10* (2013.01)

(58) Field of Classification Search
CPC ................................ G08B 21/182; G08B 3/10
USPC .......................................................... 340/540
See application file for complete search history.

(56) References Cited

U.S. PATENT DOCUMENTS 4,459,584 A 7/1984 Clarkson
4,757,305 A 7/1988 Peso
4,968,976 A * 11/1990 Johnson .................. G01F 23/60 340/625
5,163,516 A * 11/1992 Palmatier ................. A62C 3/04 169/57
5,251,482 A 10/1993 Bates et al.
5,324,171 A * 6/1994 Cook .................... F04D 13/086 417/40
5,886,249 A 3/1999 Bonne et al.
5,898,376 A 4/1999 Webb
6,766,837 B1 7/2004 Ruffa
7,177,780 B2 2/2007 Hillam et al.
7,191,649 B1 3/2007 Coogle
7,537,439 B2 * 5/2009 Pohler ..................... F04D 13/06 415/111

(Continued)

FOREIGN PATENT DOCUMENTS

WO WO-2022212797 A1 10/2022

*Primary Examiner* — Zhen Y Wu
(74) *Attorney, Agent, or Firm* — Raymond A. Joao, Esq.

(57) ABSTRACT

A vent alarm apparatus, including: a main housing; an alarm/whistle mounted or attached to or within the main housing at a top portion and which has a lower portion that extends downwardly and in a direction opposite from the main housing and terminates in a lowermost end portion of the alarm/whistle, a protective cover attached or mounted to the main housing at a top portion and which extends downwardly and in a direction towards the lowermost end portion of the alarm/whistle. The protective cover has a lowermost end portion that extends beyond and below the lowermost end portion of the alarm/whistle, allows for an entry of a heating oil, liquid, substance, or material, into the lowermost end portion of the protective cover, and allows for a flowing of the heating oil, liquid, substance, or material, in a direction towards the lowermost end portion of the alarm/whistle.

20 Claims, 10 Drawing Sheets

(56) References Cited

U.S. PATENT DOCUMENTS

| | | | | |
|---|---|---|---|---|
| 8,319,626 | B1 * | 11/2012 | Cantolino | F24H 9/2021 122/13.01 |
| 8,922,379 | B1 * | 12/2014 | Meyer | G08B 25/14 340/521 |
| 8,959,774 | B2 | 2/2015 | Cajiga et al. | |
| 10,152,877 | B2 | 12/2018 | Linder et al. | |
| 10,907,340 | B1 * | 2/2021 | Conder | E03F 5/22 |
| 11,111,130 | B2 | 9/2021 | Bevins et al. | |
| 2002/0167587 | A1 | 11/2002 | Ogasawara | |
| 2004/0145465 | A1 | 7/2004 | Stults et al. | |
| 2010/0045096 | A1 * | 2/2010 | Schonlau | F04B 45/043 303/10 |
| 2011/0068918 | A1 * | 3/2011 | Cummings | G08B 21/0461 340/10.1 |
| 2012/0085688 | A1 * | 4/2012 | Schmidt | F04D 29/2288 210/119 |
| 2013/0105013 | A1 * | 5/2013 | Burrows | B01D 21/0039 137/597 |
| 2016/0039656 | A1 | 2/2016 | Walsh et al. | |
| 2016/0255429 | A1 | 9/2016 | Dickson | |
| 2023/0092170 | A1 * | 3/2023 | Arminak | F04B 53/06 417/454 |
| 2023/0274628 | A1 * | 8/2023 | Ulliman | G08B 21/182 340/618 |

* cited by examiner

VENT ALARM WITH PROTECTIVE COVER

RELATED APPLICATIONS

This application claims the benefit of the priority of U.S. Provisional Patent Application Ser. No. 63/449,633, filed Mar. 3, 2023, and entitled "VENT ALARM WITH PROTECTIVE COVER", the subject matter and teachings of which are hereby incorporated by reference herein in their entirety.

FIELD OF THE INVENTION

The present invention pertains to a vent alarm with a protective cover and, in particular, the present invention pertains to a vent alarm which can be utilized in connection with oil tanks and/or with other storage tanks for any type or kind of liquids, substances, and/or materials, which is equipped with a protective cover for a whistle component of the same.

BACKGROUND OF THE INVENTION

Vent alarms are well known for being used in connection with storage tanks for heating oil and other types or kinds of liquids, substances, and/or materials. In the case of heating oil and/or other liquids, substances, and/or materials, which can be hazardous if spilled during the delivery of the same into a storage tank, vent alarms play a critical role in providing notification of a near full, or full tank, condition.

Vent alarms operate in accordance with a simple and an easy to understand principle. As the respective heating oil or other liquid, substance, or material, is pumped into the storage tank, air in the storage tank is displaced by the entering and respective heating oil or other liquid, substance, or material, and the air exits the storage tank via a venting pipe to the exterior environment. The vent alarm is positioned at the top of the storage tank, or at any other suitable location. As the air, which exits the storage tank, passes through the alarm or whistle component of the vent alarm, a whistling sound emanates from the same. The whistling sound serves to signal that there is room or space in the tank for additional heating oil or other liquid, substance, or material, to be delivered into the tank. When the whistling sound ceases, indicating that the storage tank is full, the delivery of the respective heating oil or other liquid, substance, or material, must cease in order to prevent a spill condition. As is well known, heating oil spills and spills involving other hazardous liquids, substances, or materials, can be very costly and dangerous.

It is submitted that the proper and safe operation of any vent alarm requires that the alarm or whistle component of the same remain fully operational and operate without obstructions of any kind or nature. Any kind of material which might come into contact with the alarm or whistle component can cause it to cease from operating properly.

It is also submitted that storage tanks for heating oil and other types or kinds of liquids, substances, or materials, can also contain unwanted substances or materials, which can form in storage tanks over time and/or which can be introduced into the storage tanks unintentionally. For example, in the case of storage tanks for heating oil, sludge is known to form in the same. While sludge might typically form on or at the bottom of heating oil tanks, portions of the same can be dislodged and/or churned up and the same can float to the top of, or in, the oil in the storage tank during a heating oil delivery. It is submitted that sludge, and/or other particles dislodged along with sludge, can come into contact with, can cling to, or can become attached to various components of, the alarm or whistle component of the vent alarm and can thereby cause the alarm or whistle to cease to operate in a proper manner.

It is also submitted, and has been observed, that substances can also, over time, form a coagulated substance, and/or can form a slime or other formation, on and/or at the top of heating oil, and that the same may or may not be related to or result from the aforementioned sludge. It is submitted that this coagulated substance and/or slime or other formation, can also come into contact with, can cling to, or can become attached to various components of the alarm or whistle component of the vent alarm, and can thereby cause the same to cease to operate in a proper manner.

It is submitted that prior art vent alarms have a major shortcoming in that they fail to provide adequate protection for the alarm or whistle components of the same. This major shortcoming can result in vent alarm malfunctions, and in a resulting overflow and/or spilling of heating oil and/or liquids, substances, and/or materials. As is well known to those skilled in the pertinent art, the overflowing or spilling of heating oil and/or other liquids, substances, and/or materials, can cause health hazards, can cause damage to property, and requires costly repairs and/or remediation efforts.

In view of the foregoing, there are numerous problems that exist in existing vent alarms which require technological solutions and improvements to their existing technology.

SUMMARY OF THE INVENTION

The present invention pertains to a vent alarm with a protective cover and, in particular, the present invention pertains to a vent alarm which can be utilized in connection with oil tanks and/or with other storage tanks for any type or kind of liquids, substances, and/or materials, which is equipped with a protective cover for a whistle component of the same, which overcomes the shortcomings of the prior art.

The present invention pertains to a new and improved vent alarm which can be utilized in connection with oil tanks and/or with other storage tanks for any type or kind of liquids, substances, and/or materials. The present invention pertains to an apparatus which is a new and improved vent alarm which provides protection to the alarm or whistle component of the vent alarm, or any portion of the same, during the filling of, or delivery of, heating oil or any other type or kind of liquid, substance, and/or material, into a storage tank.

The present invention serves to protect the alarm or whistle component of the vent alarm, or any portion of the same, from coming into contact with a coagulated substance and/or slime, or other formation, or any sludge elements, which may float on top of, or under the surface of, the heating oil, liquid, substance, or material, which is being delivered into, or stored inside, a respective storage tank, during a delivery operation and/or at any other time.

The present invention serves to protect the alarm or whistle component of the vent alarm from having its operation hindered by, adversely affected by, and/or being rendered inoperable by, any coagulated substance and/or slime, or other formation, or any sludge elements, which may come into contact with, and/or which may cling to or on, or which may form on, the alarm or whistle component or any portion of the same.

The present invention serves to protect the alarm or whistle component of the vent alarm from having its operation hindered by, adversely affected by, and/or being rendered inoperable by, any coagulated substance and/or slime, or other formation, or any sludge elements, which may come into contact with, and/or which may cling to or on, or which may form on, the alarm or whistle component, or any portion of the same, during a delivery operation and/or at any other time.

The present invention also serves to protect the alarm or whistle component of the vent alarm from having its operation hindered by, adversely affected by, and/or being rendered inoperable by, any coagulated substance and/or slime, or other formation, or any sludge elements, which may become affixed to, or which may surround or encompass, or otherwise cover or coat, the alarm or whistle component, or any portion of the same, of the vent alarm during a delivery operation and/or at any other time.

The present invention effectuates an improvement to existing vent alarms which are known to those skilled in the pertinent art. The present invention includes a cover, which is attached to a housing of the vent alarm, which extends beyond of the length of the alarm or whistle component, so as to protect the alarm or whistle component from any coagulated substance and/or slime, or other formation, or any sludge elements, which may be floating on, or beneath, the surface of the respective heating oil, liquid, substance, or material, which is being delivered into or stored with the respective storage tank.

The cover of apparatus of the present invention protects the alarm or whistle component of the same deflecting any coagulated substance and/or slime, or other formation, or any sludge elements, which may be floating on, or beneath, the surface of the respective heating oil, liquid, substance, or material, from coming into contact with and compromising the operation of the alarm or whistle component of the apparatus. The cover of the apparatus prevents any coagulated substance and/or slime, or other formation, or any sludge elements, which may be floating on, or beneath, the surface of the respective heating oil, liquid, substance, or material, from coming into contact with and compromising the operation of the alarm or whistle component of the apparatus.

The apparatus of the present invention can include and/or contain any and/or all of the components that are typically known to be included in conventional vent alarms, including a main housing which can include any and/or all of the components or parts which are typically found in the housing of conventional vent alarms, an alarm or whistle component which can include any and/or all of the components or parts which are typically found in the alarm or whistle component of conventional vent alarms, and a protective cover which is attached or affixed to a portion of the main housing and which extends downwardly and below the lowermost end portion of the alarm or whistle component. The alarm or whistle component is attached to, or mounted to or within, the main housing at a top portion of the alarm or whistle component, and a lower end portion of the alarm or whistle component extends downwardly and in a direction opposite from the main housing.

The protective cover has a lowermost end portion that extends below the lowermost end portion of the alarm or whistle component. The extension of the lowermost end portion of the protective cover beyond the lowermost end portion of the alarm or whistle component serves to prevent any coagulated substance and/or slime, or other formation, or any sludge elements, which may be floating on, or beneath, the surface of the respective heating oil, liquid, substance, or material, from coming into contact with and compromising the integrity and/or operation of the alarm or whistle component.

The protective cover can have a cylindrical shape, or the protective cover can have a square shape, a rectangular shape, or any other suitable shape, as long the top end portion of the protective cover and the protective cover can be securely attached to, or affixed to, or connected to or with, a lower portion of the main housing. The protective cover can be securely attached to, or affixed to, or connected to or with, the lower portion of the main housing, by using threaded portions on each of the main housing and the protective cover, by using appropriate and/or suitable hardware such as screws, nuts and bolts, glue, and/or epoxy, by using any other suitable substance or material, and/or by using any combination of the same.

The protective cover can be manufactured from any suitable plastic or plastic material, from any suitable metal, including, but not limited to, tin, aluminum, steel, brass, or any other suitable metal, from any suitable composite material, and/or from any combination of the same.

The protective cover can be any suitable hollow cylinder or any hollow object of any suitable shape. The protective cover can or should allow for the unimpeded and uniform flowing, and filling up, of heating oil, or any other liquid, substance, or material, into the respective storage tank, and relative to the alarm or whistle component, during any filling or delivery process.

The protective cover serves to protect the alarm or whistle component from coming to contact with any coagulated substance and/or slime, or other formation, or any sludge elements, which may be floating on, or beneath, the surface of the respective heating oil, liquid, substance, or material, during a delivery operation or at any other time. Likewise, the protective cover serves to prevent any coagulated substance and/or slime, or other formation, or any sludge elements, which may be floating on, or beneath, the surface of the respective heating oil, liquid, substance, or material, from coming into contact with the alarm or whistle component, during a delivery operation or at any other time.

The protective cover protects the alarm or whistle component from any coagulated substance and/or slime, or other formation, or any sludge elements, which may be floating on, or beneath, the surface of the respective heating oil, liquid, substance, or material, by deflecting the coagulated substance and/or slime, or other formation, or any sludge elements, or by preventing coagulated substance and/or slime, or other formation, or any sludge elements from coming into contact with the alarm or whistle component. In this regard, the present invention and, in particular, the protective cover prevents any damage to, or compromising of, the alarm or whistle component.

The protective cover of the apparatus can be securely attached to, or affixed to, or connected to or with, an interior portion of the main housing, or it can be securely attached to, or affixed to, or connected to or with, an exterior portion of the main housing.

The protective cover can have any suitable shape. The protective cover can have a uniform diameter along it length, or it can have portions which have diameters of different or differing along the length of the same. The protective cover can have a cylindrical shape, or the protective cover can have a square shape, a rectangular shape, or any other suitable shape, as long the protective cover can be securely attached to, or affixed to, or connected to or with, the lower portion of the main housing. The protective cover can be securely attached to, or affixed to, or connected to or with, an interior or at an exterior of the lower portion of the main housing, by using respective threaded portions on each of the main housing and the protective cover, by using appropriate and/or suitable hardware such as screws, nuts and bolts, glue, and/or epoxy, by using any other suitable substance or material, and/or by using any combination of the same.

The protective cover can also be provided with a protective screen or grating located at the lowermost end of the same. The protective cover can be designed and/or chosen so as to have a lower portion which has a cross sectional diameter which increases, or fans outwardly, towards or at the bottom of the protective cover. The protective cover can also be designed and/or chosen so as to have a lower portion which has a cross sectional diameter which increases, or fans outwardly, at a location which is located further down and towards or at the bottom of the protective cover. The protective cover can also have a lowermost portion that decreases in diameter, or fans inwardly, at or towards the bottom of the protective cover.

The protective cover can serve to protect the alarm or whistle component from and against any coagulated substance and/or slime, or other formation, or any sludge element or any mass while allowing for the unimpeded delivery, and for the maintaining of a uniform surface level, of a respective heating oil, liquid, substance, or material, into a respective storage tank.

The present invention can be utilized in order to preserve the proper functioning of the alarm or whistle component of, and the vent alarm of, the present invention apparatus, and can ensure for the safe delivery of a respective heating oil, liquid, substance, or material, into a respective storage tank.

DESCRIPTION OF THE PREFERRED EMBODIMENTS

Figure 1:
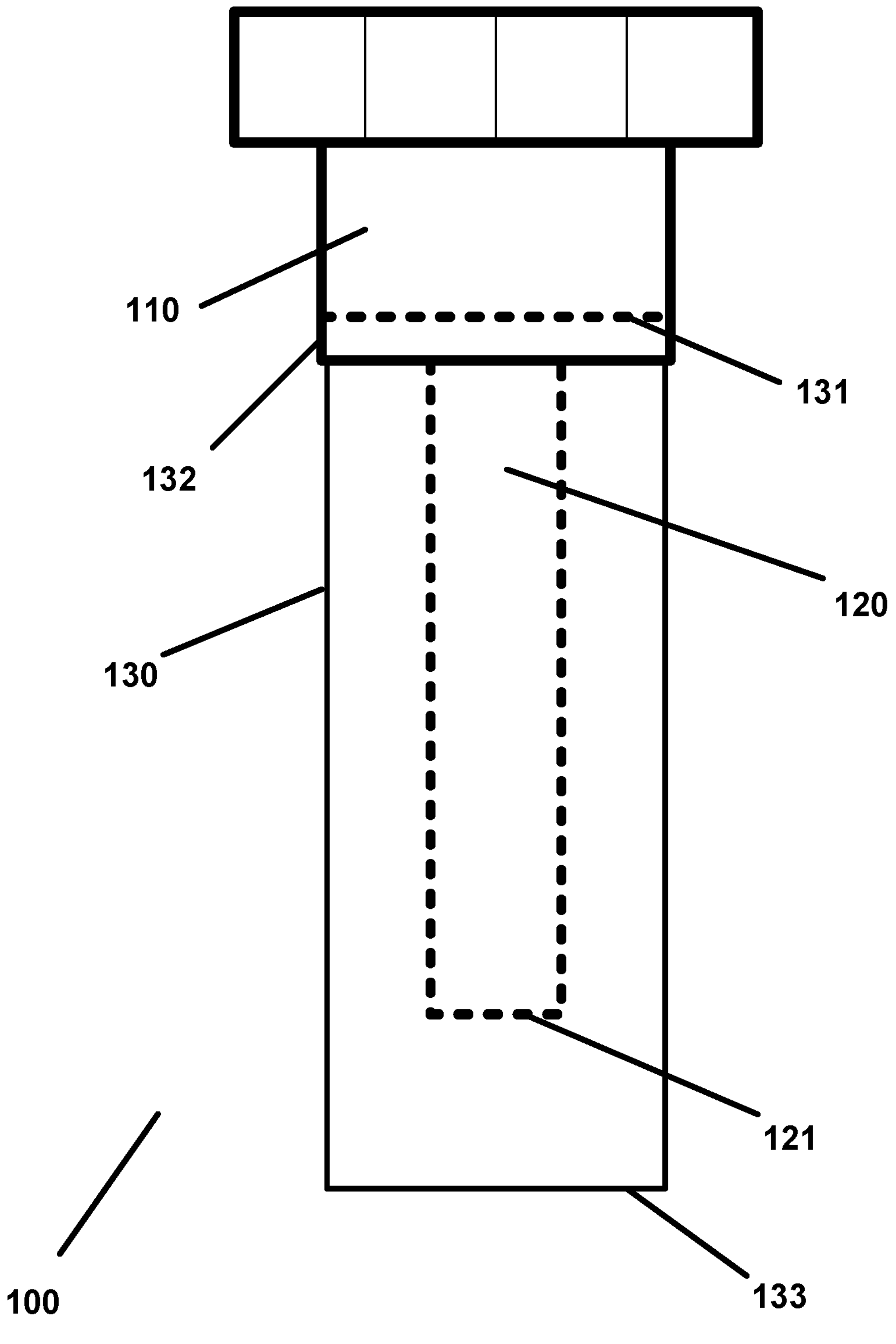
FIG. 1 illustrates a preferred embodiment of the apparatus of the present invention from a side view perspective.

The present invention pertains to a vent alarm with and having a protective cover and, therefore, the present invention pertain to a new and improved vent alarm. In particular, the present invention pertains to a new and improved vent alarm which can be utilized in connection with oil tanks and/or with other storage tanks for any type or kind of liquids, substances, and/or materials, which is equipped with a protective cover for a whistle component of the same, which overcomes the shortcomings of the prior art. The present invention pertains to an apparatus which is a new and improved vent alarm which provides protection to the alarm or whistle component of the vent alarm, or any portion of the same, during the filling of, or delivery of, heating oil or any other type or kind of liquid, substance, and/or material, into a storage tank.

The apparatus of the present invention serves to protect the alarm or whistle component of the vent alarm, or any portion of the same, from coming into contact with a coagulated substance and/or slime, or other formation, or any sludge elements, which may float on top of, or under the surface of, the heating oil, liquid, substance, or material, which is being delivered into, or stored inside, a respective storage tank, during a delivery operation and/or at any other time.

The apparatus of the present invention serves to protect the alarm or whistle component of the vent alarm from having its operation hindered by, adversely affected by, and/or being rendered inoperable by, any coagulated substance and/or slime, or other formation, or any sludge elements, which may come into contact with, and/or which may cling to or on, or which may form on, the alarm or whistle component or any portion of the same.

The apparatus of the present invention serves to protect the alarm or whistle component of the vent alarm from having its operation hindered by, adversely affected by, and/or being rendered inoperable by, any coagulated substance and/or slime, or other formation, or any sludge elements, which may come into contact with, and/or which may cling to or on, or which may form on, the alarm or whistle component, or any portion of the same, during a delivery operation and/or at any other time.

The apparatus of the present invention serves to protect the alarm or whistle component of the vent alarm from having its operation hindered by, adversely affected by, and/or being rendered inoperable by, any coagulated substance and/or slime, or other formation, or any sludge elements, which may become affixed to, or which may surround or encompass, or otherwise cover or coat, the alarm or whistle component, or any portion of the same, of the vent alarm during a delivery operation and/or at any other time.

In a preferred embodiment, the apparatus of the present invention effectuates an improvement to existing vent alarms which are known to those skilled in the pertinent art. In a preferred embodiment, the apparatus of the present invention includes a cover, which is attached to a housing of the vent alarm, which extends beyond of the length of the alarm or whistle component, so as to protect the alarm or whistle component from any coagulated substance and/or slime, or other formation, or any sludge elements, which may be floating on, or beneath, the surface of the respective heating oil, liquid, substance, or material, which is being delivered into or stored with the respective storage tank.

In a preferred embodiment, the cover of the apparatus protects the alarm or whistle component of the apparatus by deflecting any coagulated substance and/or slime, or other formation, or any sludge elements, which may be floating on, or beneath, the surface of the respective heating oil, liquid, substance, or material, from coming into contact with and compromising the operation of the alarm or whistle component of the apparatus. In a preferred embodiment, the cover of the apparatus prevents any coagulated substance and/or slime, or other formation, or any sludge elements, which may be floating on, or beneath, the surface of the respective heating oil, liquid, substance, or material, from coming into contact with and compromising the operation of the alarm or whistle component of the apparatus.

Applicant hereby incorporates by reference herein the subject matter and teachings of U.S. Provisional Patent Application Ser. No. 63/449,633, filed Mar. 3, 2023, and entitled "VENT ALARM WITH PROTECTIVE COVER", the subject matter and teachings of which are hereby incorporated by reference herein in their entirety.

FIG. 1 illustrates a preferred embodiment of the apparatus of the present invention, which is denoted by the reference numeral 100, from a side view perspective. With reference to FIG. 1, the apparatus 100 can include and/or contain any and/or all of the components that are typically known to be included in conventional vent alarms, including the main housing 110 which can include any and/or all of the components or parts which are typically found in the housing of conventional vent alarms, an alarm or whistle component 120 (hereinafter referred to as "alarm/whistle 120") which can include any and/or all of the components or parts which are typically found in the alarm or whistle component of conventional vent alarms, and a protective cover 130 which is attached or affixed to a portion of the main housing 110 and which extends downwardly and as shown in FIG. 1. In a preferred embodiment, the alarm/whistle 120 has a lowermost end portion 121 as shown.

In a preferred embodiment, the alarm/whistle 120 is attached to, or mounted to or within, the main housing 110 at a top portion of the alarm/whistle, and a lower end portion of the alarm/whistle 120 extends downwardly and in a direction opposite from the main housing, as shown in FIG. 1, and terminates in the lowermost end portion 121. In a preferred embodiment, as well as in any and/or all of the embodiments described herein, during normal use, the alarm/whistle 120 generates or emanates a sound, an alarm noise or sound, or a whistle or whistling sound, when a respective heating oil, liquid, substance, or material, is being introduced into, filled into, or delivered into, a respective heating oil tank or storage tank.

In a preferred embodiment, the protective cover 130 has a lowermost end portion 133 that extends below the lowermost end portion 121 of the alarm/whistle 120 as shown in FIG. 1. In a preferred embodiment, the extension of the lowermost end portion 133 of the protective cover 130 beyond the lowermost end portion 121 of the alarm/whistle 120 serves to prevent any coagulated substance and/or slime, or other formation, or any sludge elements, which may be floating on, or beneath, the surface of the respective heating oil, liquid, substance, or material, from coming into contact with and compromising the integrity and/or operation of the alarm/whistle 120.

With reference once again to FIG. 1, in a preferred embodiment, the protective cover 130 can have a cylindrical shape, or the protective cover 130 can have a square shape, a rectangular shape, or any other suitable shape, as long the top end portion 131 of the protective cover 130 and the protective cover 130 can be securely attached to, or affixed to, or connected to or with, the lower portion of the main housing 110 at the region 132. In a preferred embodiment, the protective cover 130 can be securely attached to, or affixed to, or connected to or with, the lower portion of the main housing 110, by using threaded portions on each of the main housing 110 and the protective cover 130, by using appropriate and/or suitable hardware such as screws, nuts and bolts, glue, and/or epoxy, by using any other suitable substance or material, and/or by using any combination of the same.

In a preferred embodiment, the protective cover 130 is securely attached to, or affixed to, or connected to or with, an interior portion of the main housing 110 as shown in FIG. 1.

In a preferred embodiment, the protective cover 130 can be manufactured from any suitable plastic or plastic material, from any suitable metal, including, but not limited to, tin, aluminum, steel, brass, or any other suitable metal, from any suitable composite material, and/or from any combination of the same.

In a preferred embodiment, the protective cover 130 can be any suitable hollow cylinder or any hollow object of any suitable shape. In a preferred embodiment, the protective cover 130 should allow for the unimpeded and uniform flowing, and filling up, of heating oil, or any other liquid, substance, or material, into the respective storage tank, and relative to the alarm/whistle 120, during any filling or delivery process.

Figure 2:
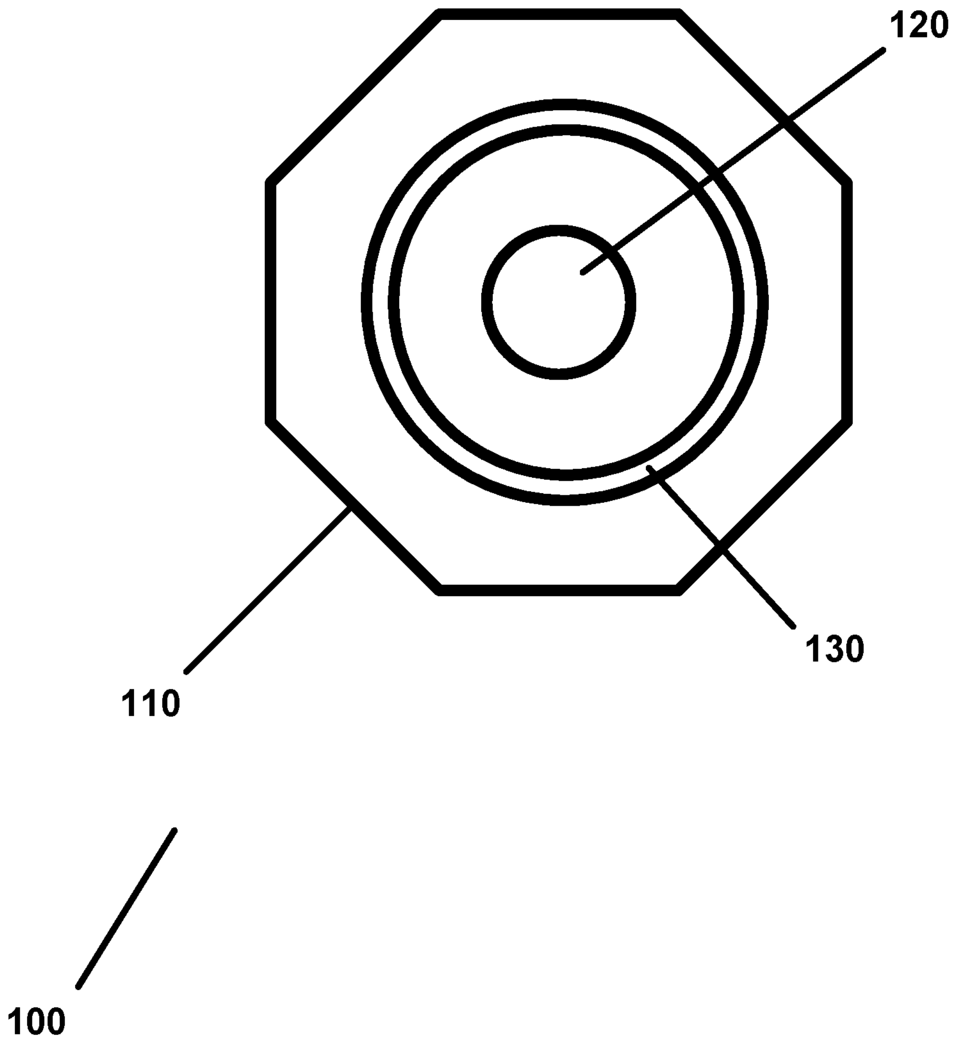
FIG. 2 illustrates the apparatus of FIG. 1 from a bottom view perspective.

FIG. 2 illustrates the apparatus 100 of FIG. 1 from a bottom view perspective. With reference to FIG. 2, the main housing 110 is shown along with the alarm/whistle 120 and the protective cover 130. With reference once again to FIG. 2, the alarm/whistle 120 is shown as being surrounded by, and/or encompassed by, the cylindrical protective cover 130 as shown.

In a preferred embodiment, the protective cover 130 serves to protect the alarm/whistle 120 from coming to contact with any coagulated substance and/or slime, or other formation, or any sludge elements, which may be floating on, or beneath, the surface of the respective heating oil, liquid, substance, or material, during a delivery operation or at any other time. Likewise, the protective cover 130 serves to prevent any coagulated substance and/or slime, or other formation, or any sludge elements, which may be floating on, or beneath, the surface of the respective heating oil, liquid, substance, or material, from coming into contact with the alarm/whistle 120 of the apparatus 100, during a delivery operation or at any other time.

Figure 3A:
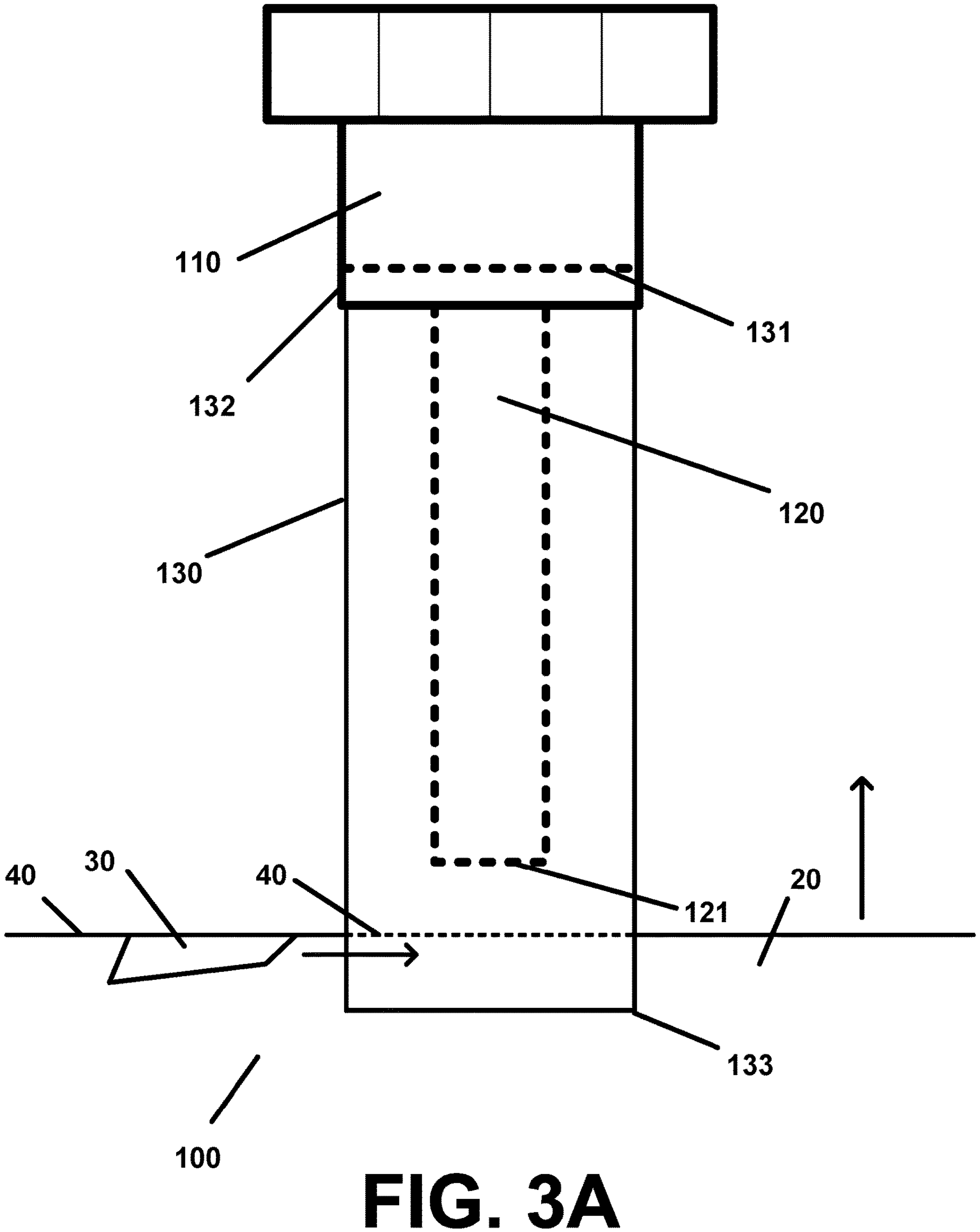
FIGS. 3A, 3B, and 3C illustrate an exemplary manner in which the apparatus of FIG. 1 can serve to protect the alarm/whistle of the apparatus from coming into contact with any coagulated substance and/or slime, or other formation, or any sludge elements.
Figure 3B:
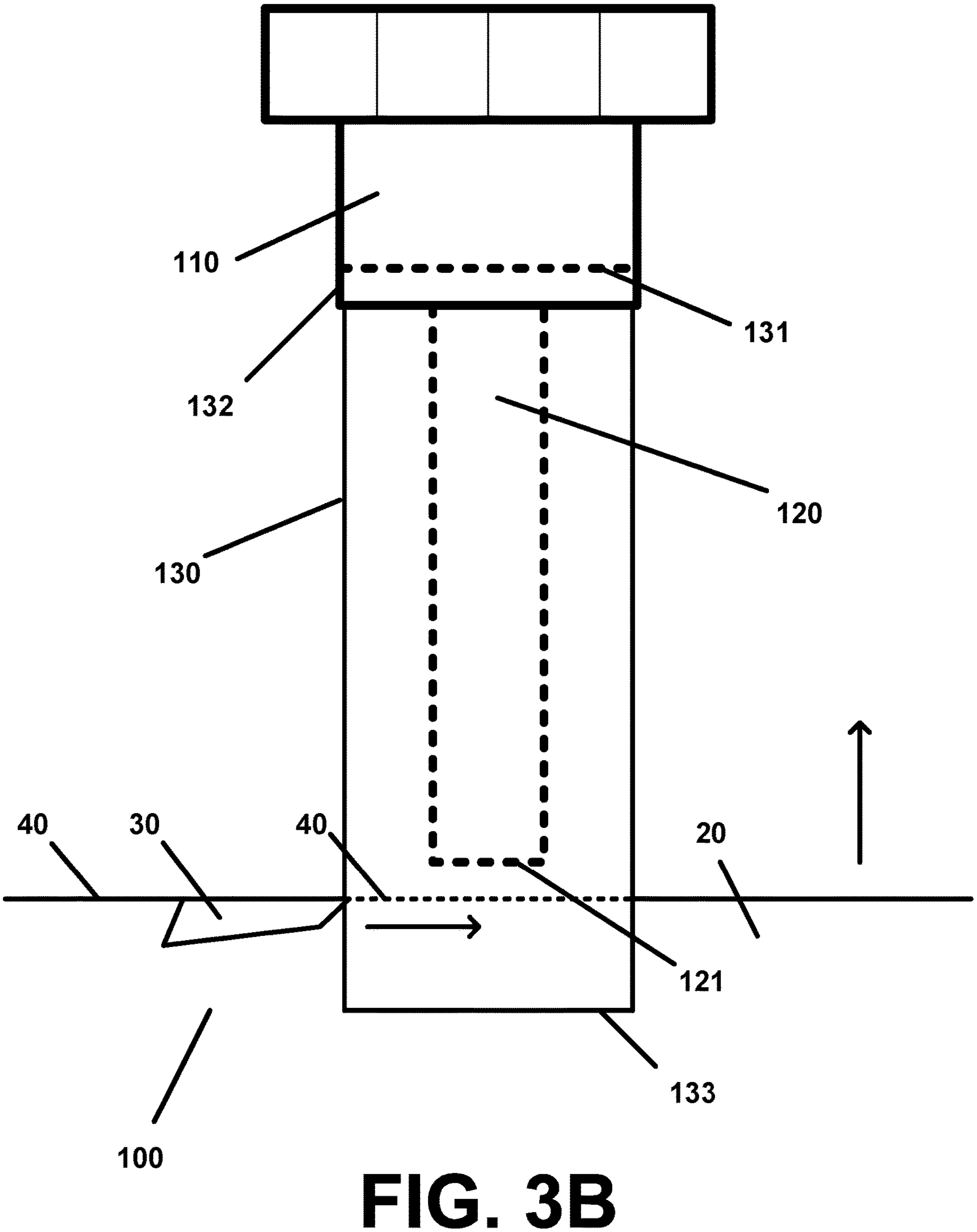
Figure 3C:
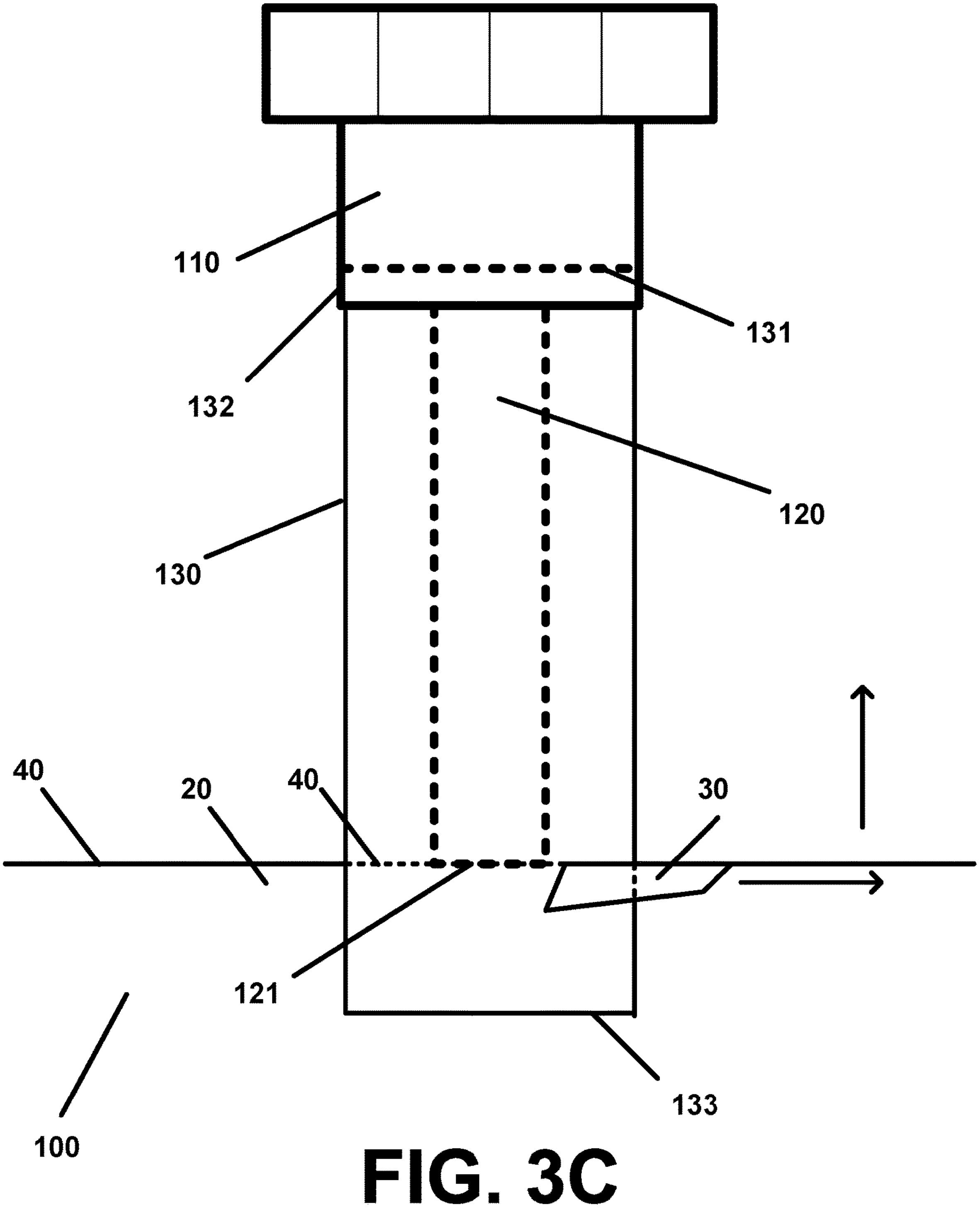

FIGS. 3A, 3B, and 3C illustrate an exemplary manner in which the apparatus 100 of FIG. 1 can serve to protect the alarm/whistle 120 from coming into contact with any coagulated substance and/or slime, or other formation, or any sludge elements. In a preferred embodiment, the embodiment of FIGS. 3A, 3B, and 3C will be described as being utilized in connection with a heating oil delivery during which heating oil is being pumped into, or delivered into, a heating oil tank which is equipped with the apparatus 100. It is, however, important to note that the embodiment of FIGS. 3A, 3B, and 3C can be utilized in connection with any delivery of any liquid, substance, or material, which can be delivered to an respective storage tank.

With reference to FIGS. 3A, 3B, and 3C, the apparatus 100 is deployed, as shown, in connection with a heating oil tank containing heating oil 20, the level of which is designated by the reference numeral 40. Also shown in FIG. 3A is object or mass 30 which can be any coagulated substance and/or slime, or other formation, or any sludge element (hereinafter "mass 30"), which may be floating on the surface 40 of the oil 20 and, as shown in FIG. 3A is moving from left to right as depicted by the arrow. As depicted in FIG. 3A, the lowermost end portion 121 of the alarm/whistle 120 is shown as being at a level above the lowermost end portion 133 of the protective cover 130. As is also shown in FIG. 3A, the protective cover 130 allows for the entry of heating oil into an within the same so as to allow for the proper operation of the alarm/whistle 120 during a heating oil delivery.

As heating oil is pumped into the heating oil tank, the level 40 of the oil 20 will rise at the same rate, and be of the same level, both outside of the protective cover 130 as well as inside the protective cover 130, as shown. FIG. 3B illustrates the movement of the mass 30 from left to right, as shown by the arrow. In FIG. 3B, the mass 30 is shown as coming into contact with the protective cover 130. As shown in FIG. 3B, the mass 30 does not come into contact with any portion of the alarm whistle 120. In the embodiment of FIG. 3B, the mass 30 remains on the outside of the protective cover 130.

FIG. 3C illustrates the movement the mass 30, from left to right in the direction of the arrow, by or along the protective cover 130 as heating oil continues to be pumped into, or delivered in, the heating oil tank, and until the heating oil level 40 reaches the level of the lowermost end portion 121 of the alarm/whistle 120, at which time the delivery of the heating oil will cease. As shown in FIG. 3C, the protective cover 130 prevents the mass 30 from coming into contact with any portion of the alarm/whistle 120.

In the above described and illustrated manner, the apparatus 100, equipped with the protective cover 130, protects the alarm/whistle 120 from the mass 30, and protects the alarm/whistle 120 from coming into contact with the mass 30. In this regard, the apparatus 100 prevents any damage to, or compromising of, the alarm/whistle 120. In this regard, the mass 30 can not come into contact with and/or contaminate, or cause damage to, the alarm/whistle 120.

As noted herein, the apparatus 100 of the present invention and the embodiment of FIGS. 3A, 3B, and 3C, can be utilized in a same, a similar, and/or an analogous manner, in connection with a delivery of any liquid, substance, or material, into a respective storage tank.

As noted herein, the protective cover 130 of the apparatus of FIG. 1 is securely attached to, or affixed to, or connected to or with, an interior portion of the main housing 110 as shown in FIG. 1. In another preferred embodiment, the protective cover can be securely attached to, or affixed to, or connected to or with, an exterior portion of the main housing 110.

Figure 4:
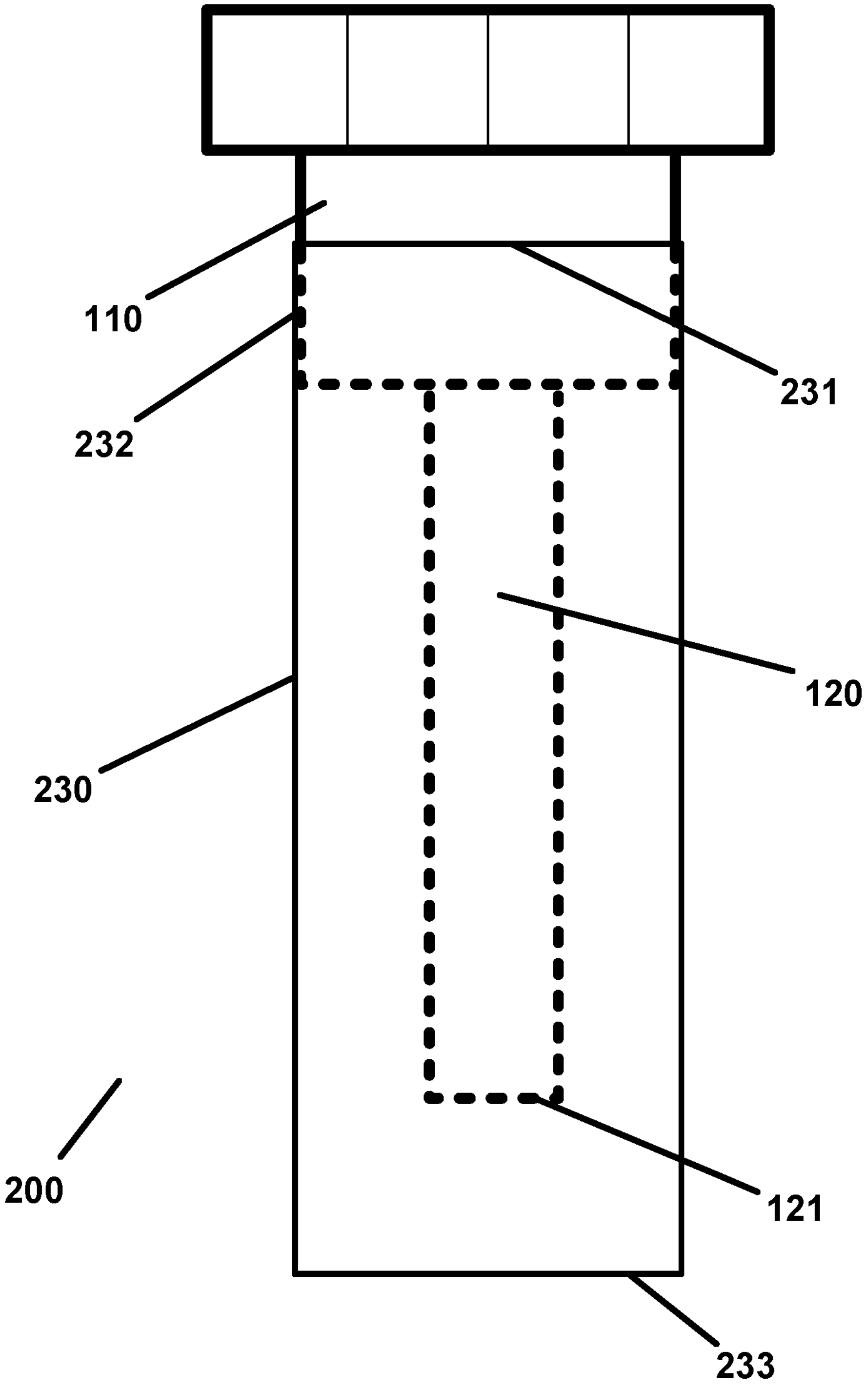
FIG. 4 illustrates another preferred embodiment of the apparatus of the present invention from a side view perspective.

FIG. 4 illustrates another preferred embodiment of the apparatus of the present invention, which is denoted by the reference numeral 200, from a side view perspective. With reference to FIG. 4, the apparatus 200 includes a main housing 110 and an alarm/whistle 120. With reference to FIG. 4, the apparatus 200 also includes protective cover 230 which is attached to, affixed to, connected to or with, or secured to, the lower portion of the main housing 110 at the region 232.

In a preferred embodiment, as in the apparatus 100 of FIG. 1, the alarm/whistle 120 is attached to, or mounted to or within, the main housing 110 at a top portion of the alarm/whistle, and a lower end portion of the alarm/whistle 120 extends downwardly and in a direction opposite from the main housing, as shown in FIG. 4, and terminates in the lowermost end portion 121.

In a preferred embodiment, the protective cover 230 has a top end portion 231. The protective cover 230 also has a lowermost end portion 233 that extends below the lowermost end portion 121 of the alarm/whistle 120 as shown in FIG. 4. In a preferred embodiment, the extension of the lowermost end portion 233 of the protective cover 230 beyond the lowermost end portion 121 of the alarm/whistle 120 serves to prevent any coagulated substance and/or slime, or other formation, or any sludge elements, which may be floating on, or beneath, the surface of the respective heating oil, liquid, substance, or material, from coming into contact with and compromising the integrity and/or operation of the alarm/whistle 120.

With reference once again to FIG. 4, in a preferred embodiment, the protective cover 230 can have a cylindrical shape, or the protective cover 230 can have a square shape, a rectangular shape, or any other suitable shape, as long the protective cover 230 can be securely attached to, or affixed to, or connected to or with, the lower portion of the main housing 110 at the region 232. In a preferred embodiment, the protective cover 230 can be securely attached to, or affixed to, or connected to or with, the lower portion of the main housing 110, by using threaded portions on each of the main housing 110 and the protective cover 230, by using appropriate and/or suitable hardware such as screws, nuts and bolts, glue, and/or epoxy, by using any other suitable substance or material, and/or by using any combination of the same.

In a preferred embodiment, the protective cover 230 is securely attached to, or affixed to, or connected to or with, an exterior portion of the main housing 110 as shown in FIG. 4.

In a preferred embodiment, the protective cover 230 can be manufactured from any suitable plastic or plastic material, from any suitable metal, including, but not limited to, tin, aluminum, steel, brass, or any other suitable metal, from any suitable composite material, and/or from any combination of the same.

Figure 5:
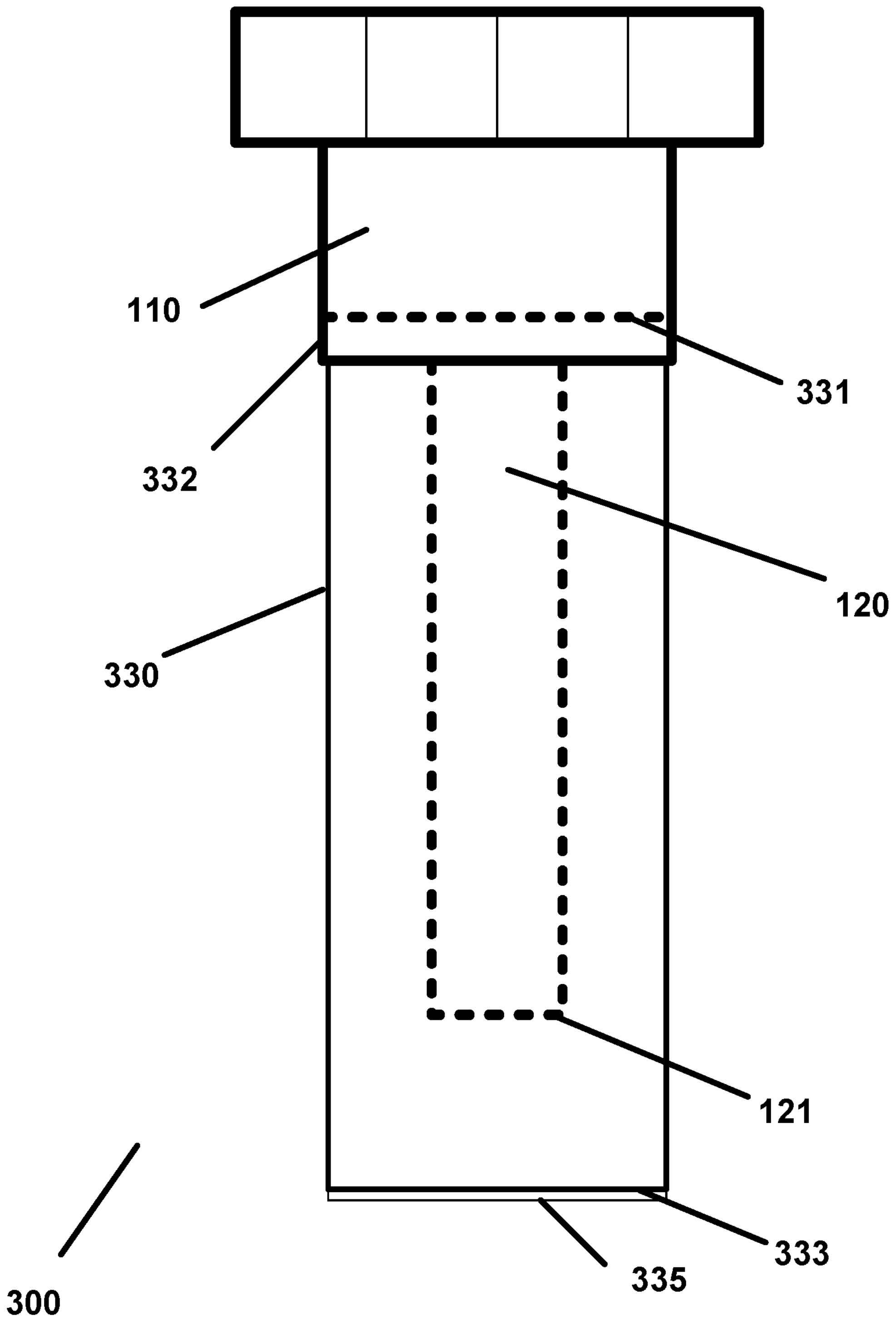
FIG. 5 illustrates still another preferred embodiment of the apparatus of the present invention from a side view perspective.

In another preferred embodiment, the protective cover 130 or 230, or any of the other protective covers described herein, can also be provided with a protective screen or grating located at the lowermost end of the same. FIG. 5 illustrates another preferred embodiment of the apparatus, denoted by the reference numeral 300, from a side view perspective. With reference to FIG. 5, the apparatus 300 contains all of the same components described and illustrated herein with respect to the embodiment of the apparatus 100 of FIG. 1. In addition, the apparatus 300 includes a protective cover 330 which includes, or which has attached, at the lowermost end portion 333 of the same, a screen or grating 335 (hereinafter "screen 335"). In a preferred embodiment, the screen 335 serves to prevent any objects, substances, and/or formations, from coming into contact with the alarm/whistle 120. In a preferred embodiment, the screen 335 should be selected and/or deigned so as not to impede the free flowing of the respective heating oil, liquid, substance, or material, relative to the apparatus 100 and to the alarm/whistle 120.

With reference once again to FIG. 5, the protective cover 330 has a top end portion 331 and the protective cover 330 can be securely attached to, or affixed to, or connected to or with, the lower portion of the main housing 110 at the region 332.

In another preferred embodiment, the protective cover of the apparatus 100 can be on any shape, size, or configuration, provided that it allows for the unimpeded flow of the respective heating oil, liquid, liquid, substance, or material, relative to the alarm/whistle 120 of the apparatus.

In another preferred embodiment, the protective cover of the apparatus can be designed and/or chosen so as to have a lower portion which has a cross sectional diameter which increases, or fans outwardly, towards or at the bottom of the protective cover.

Figure 6:
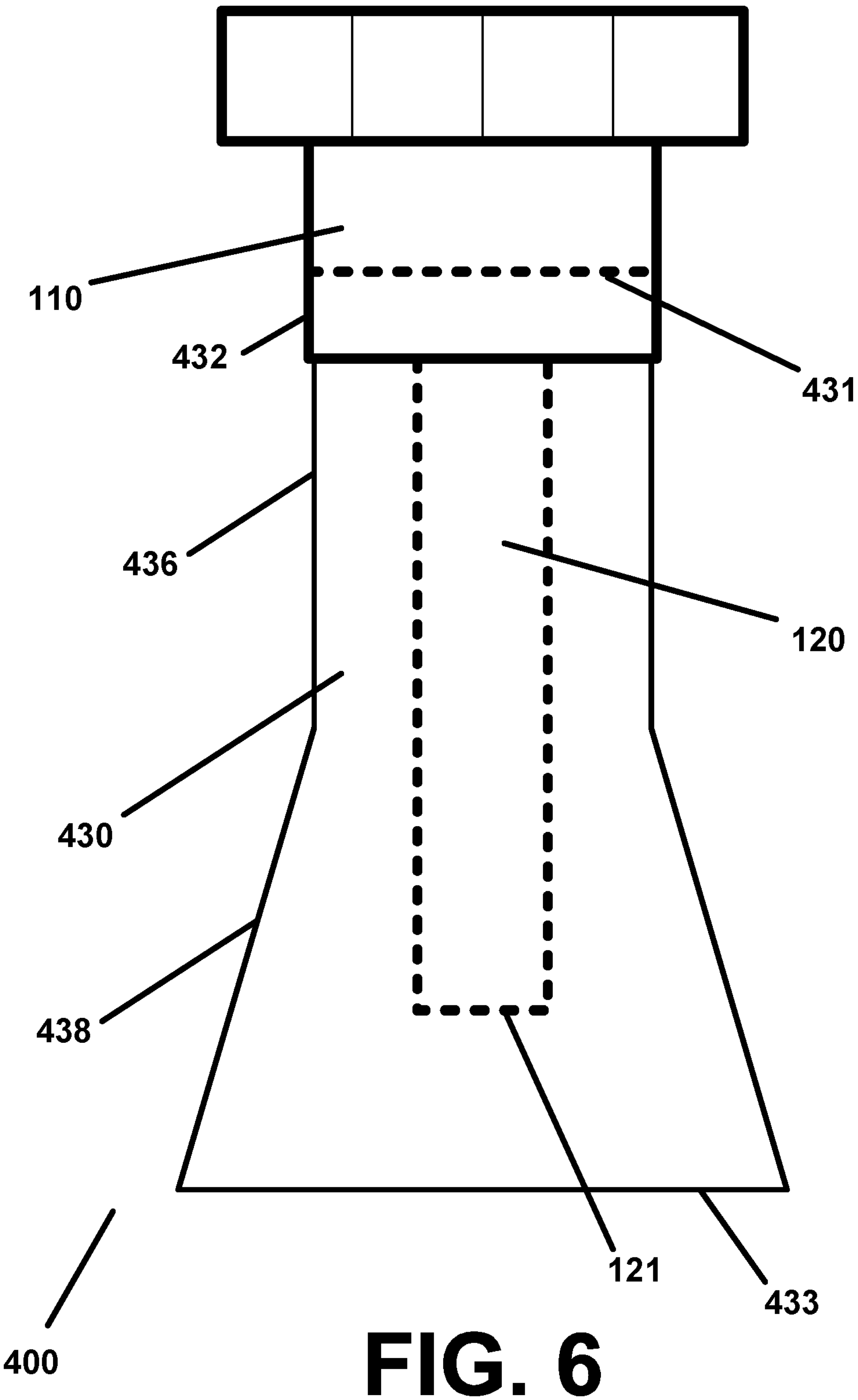
FIG. 6 illustrates yet another preferred embodiment of the apparatus of the present invention from a side view perspective.

FIG. 6 illustrates another preferred embodiment of the apparatus of the present invention, which is denoted by the reference numeral 400, from a side view perspective. With reference to FIG. 6, the apparatus 400 includes a main housing 110 and the alarm/whistle 120 which alarm/whistle 120 has the lowermost end portion 121.

In a preferred embodiment, as in the apparatus 100 of FIG. 1, the alarm/whistle 120 is attached to, or mounted to or within, the main housing 110 at a top portion of the alarm/whistle, and a lower end portion of the alarm/whistle 120 extends downwardly and in a direction opposite from the main housing, as shown in FIG. 6, and terminates in the lowermost end portion 121.

With reference once again to FIG. 6, the apparatus 400 also includes protective cover 430 which has an upper portion 436 which has a uniform diameter and a lower portion 438 which has a diameter which increases downwardly as shown. With reference once again to FIG. 6, the protective cover 430 has a lowermost end portion 433 that extends below the lowermost end portion 121 of the alarm/whistle 120. With reference once again to FIG. 6, the protective cover 430 also has a top end portion 431 and the protective cover 430 can be securely attached to, or affixed to, or connected to or with, the lower portion of the main housing 110 at the region 432.

In another preferred embodiment, the protective cover of the apparatus can also be designed and/or chosen so as to have a lower portion which has a cross sectional diameter which increases, or fans outwardly, at a location which is located further down and towards or at the bottom of the protective cover than the protective cover 430 of FIG. 6.

Figure 7:
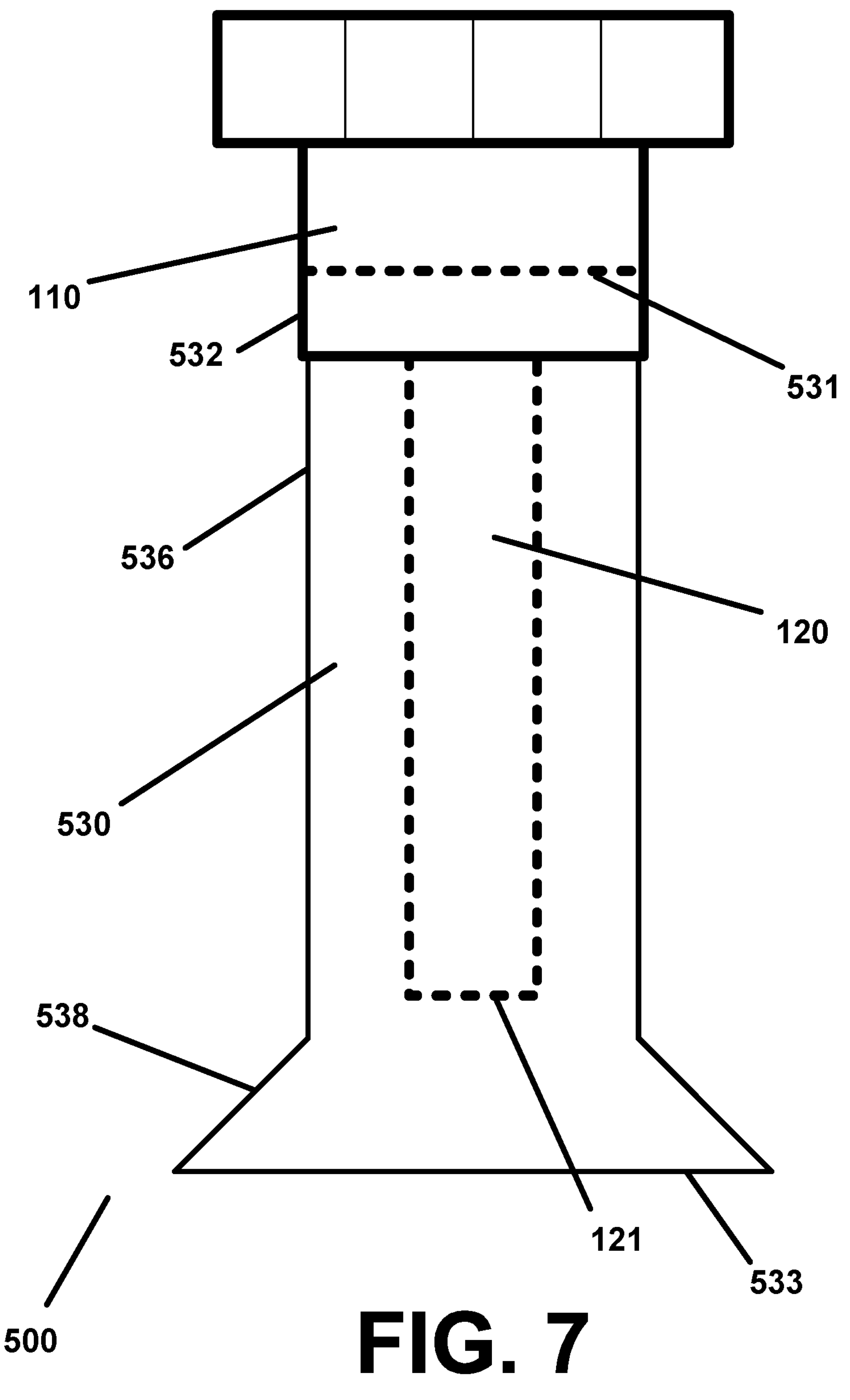
FIG. 7 illustrates another preferred embodiment of the apparatus of the present invention from a side view perspective.

FIG. 7 illustrates another preferred embodiment of the apparatus of the present invention, which is denoted by the reference numeral 500, from a side view perspective. With reference to FIG. 7, the apparatus 500 includes a main housing 110 and the alarm/whistle 120 which alarm/whistle 120 has the lowermost end portion 121.

In a preferred embodiment, as in the apparatus 100 of FIG. 1, the alarm/whistle 120 is attached to, or mounted to or within, the main housing 110 at a top portion of the alarm/whistle, and a lower end portion of the alarm/whistle 120 extends downwardly and in a direction opposite from the main housing, as shown in FIG. 7, and terminates in the lowermost end portion 121.

With reference once again to FIG. 7, the apparatus 500 also includes protective cover 530 which has an upper portion 536 which has a uniform diameter and a lower portion 538 which has a diameter which increases downwardly as shown. With reference once again to FIG. 7, the protective cover 530 has a lowermost end portion 533 that extends below the lowermost end portion 121 of the alarm/whistle 120. With reference once again to FIG. 7, the protective cover 530 also has a top end portion 531 and the protective cover 530 can be securely attached to, or affixed to, or connected to or with, the lower portion of the main housing 110 at the region 532. As can be seen in FIG. 7, the lowermost end portion 533 of the protective cover 530 begins to increase in diameter, or to fan out, at a location along the protective cover 530 which is lower than the location at which the lowermost portion 438 of the protective cover 430 begins to increase in diameter, or to fan out.

In yet another preferred embodiment, the protective cover of the apparatus can have a lowermost portion that decreases in diameter, or fans inwardly, at or towards the bottom of the protective cover.

Figure 8:
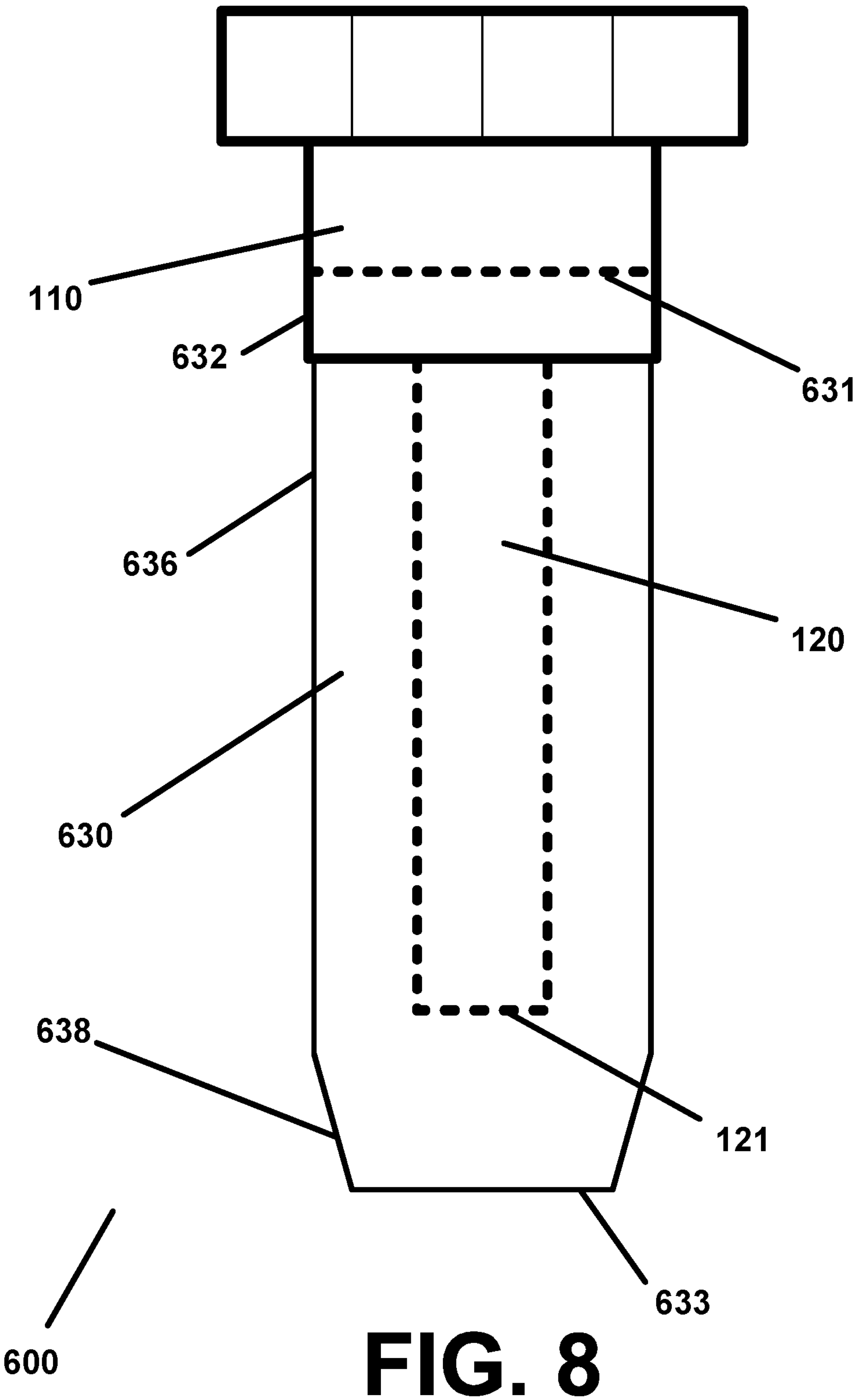
FIG. 8 illustrates still another preferred embodiment of the apparatus of the present invention from a side view perspective.

FIG. 8 illustrates another preferred embodiment of the apparatus of the present invention, which is denoted by the reference numeral 600, from a side view perspective. With reference to FIG. 8, the apparatus 600 includes a main housing 110 and the alarm/whistle 120 which alarm/whistle 120 has the lowermost end portion 121.

In a preferred embodiment, as in the apparatus 100 of FIG. 1, the alarm/whistle 120 is attached to, or mounted to or within, the main housing 110 at a top portion of the alarm/whistle, and a lower end portion of the alarm/whistle 120 extends downwardly and in a direction opposite from the main housing, as shown in FIG. 8, and terminates in the lowermost end portion 121.

With reference once again to FIG. 8, the apparatus 600 also includes protective cover 630 which has an upper portion 636 which has a uniform diameter and a lower portion 638 which has a diameter which decreases downwardly as shown. With reference once again to FIG. 8, the protective cover 630 has a lowermost end portion 633 that extends below the lowermost end portion 121 of the alarm/whistle 120. With reference once again to FIG. 8, the protective cover 630 also has a top end portion 631 and the protective cover 630 can be securely attached to, or affixed to, or connected to or with, the lower portion of the main housing 110 at the region 632.

In any and/or all of the preferred embodiments of FIGS. 1, 2, 3A, 3B, 3C, 4, 5, 6, 7, and 8, as well as any other preferred embodiments, the respective protective cover 130, 230, 330, 430, 530, and/or 630, or any other protective cover utilized in connection with the apparatus of the present invention, can serve to protect the alarm/whistle 120 from and against any coagulated substance and/or slime, or other formation, or any sludge element or any mass 30 while allowing for the unimpeded delivery, and for the maintaining of a uniform surface level, of a respective heating oil, liquid, substance, or material, into a respective storage tank.

The apparatus 100, 200, 300, 400, 500, 600, or any other embodiment of the same can be utilized to protect, and to preserve the proper functioning of, the alarm/whistle 120 of, and the vent alarm of, the respective apparatus and can ensure for the safe delivery of a respective heating oil, liquid, substance, or material, into a respective storage tank.

While the present invention has been described and illustrated in various preferred and alternate embodiments, such descriptions are merely illustrative of the present invention and are not to be construed to be limitations thereof. In this regard, the present invention encompasses all modifications, variations, and/or alternate, embodiments, with the scope of the present invention being limited only by the claims which follow.

What is claimed is:

1. A vent alarm apparatus, comprising:

a main housing;

an alarm/whistle, wherein the alarm/whistle is mounted or attached to or within the main housing at a top portion of the alarm/whistle, and further wherein the alarm/whistle has a lower portion of the alarm/whistle that extends downwardly and in a direction opposite from the main housing and terminates in a lowermost end portion of the alarm/whistle;

a protective cover, wherein the protective cover is attached to or mounted to the main housing at a top portion of the protective cover, and further wherein the protective cover extends downwardly and in a direction towards the lowermost end portion of the alarm/whistle, and further wherein the protective cover has a lowermost end portion of the protective cover that extends beyond and below the lowermost end portion of the alarm/whistle, and further wherein the protective cover allows for an entry of a heating oil, a liquid, a substance, or a material, into the lowermost end portion of the protective cover, and further wherein the protective cover allows for a flowing of the heating oil, the liquid, the substance, or the material, in a direction towards the lowermost end portion of the alarm/whistle.

2. The vent alarm apparatus of claim 1, wherein the alarm/whistle generates a sound, an alarm noise or sound, or a whistle or whistling sound, when the heating oil, the liquid, the substance, or the material, is being introduced into, filled into, or delivered into, a heating oil tank or a storage tank.

3. The vent alarm apparatus of claim 1, wherein the vent alarm apparatus is a heating oil tank vent alarm.

4. The vent alarm apparatus of claim 1, wherein the protective cover is attached to or secured to the main housing via a threaded connection.

5. The vent alarm apparatus of claim 1, wherein the protective cover is attached to an interior side of the main housing via a threaded connection.

6. The vent alarm apparatus of claim 1, wherein the protective cover is attached to an exterior side of the main housing via a threaded connection.

7. The vent alarm apparatus of claim 1, wherein the protective cover is attached to or secured to the main housing with a bolt and nut, or wherein the protective cover is attached to or secured to the main housing with a screw.

8. The vent alarm apparatus of claim 1, wherein the protective cover is attached to or secured to the main housing with a glue or an epoxy.

9. The vent alarm apparatus of claim 1, wherein the protective cover prevents a coagulated substance, a slime, a formation, or a sludge element, from coming into contact with the alarm/whistle.

10. The vent alarm apparatus of claim 1, wherein the protective cover deflects a coagulated substance, a slime, a formation, or a sludge element, away from the alarm/whistle.

11. The vent alarm apparatus of claim 1, wherein the protective cover has a uniform diameter along its entire length.

12. The vent alarm apparatus of claim 1, wherein the protective cover has a first diameter at the top portion of the protective cover, and further wherein the protective cover has a second diameter at the lowermost end portion of the protective cover.

13. The vent alarm apparatus of claim 12, wherein the second diameter is larger or greater than the first diameter.

14. The vent alarm apparatus of claim 12, wherein the first diameter is larger or greater than the second diameter.

15. The vent alarm apparatus of claim 1, further comprising:

a screen or a grating, wherein the screen or the grating is located at the lowermost end portion of the protective cover.

16. The vent alarm apparatus of claim 1, wherein the protective cover is manufactured from or with a plastic, or from or with tin or aluminum.

17. The vent alarm apparatus of claim 1, wherein the protective cover is manufactured from or with a metal.

18. The vent alarm apparatus of claim 1, wherein the lowermost end portion of the protective cover is open and receives at least a portion of the heating oil, the liquid, the substance, or the material, introduced into, filled into, or delivered into, a heating oil tank or a storage tank.

19. A vent alarm apparatus, comprising:

a main housing;

an alarm/whistle, wherein the alarm/whistle is mounted or attached to or within the main housing at a top portion of the alarm/whistle, and further wherein the alarm/whistle has a lower portion of the alarm/whistle that extends downwardly and in a direction opposite from the main housing and terminates in a lowermost end portion of the alarm/whistle;

a protective cover, wherein the protective cover is attached to or mounted to the main housing at a top portion of the protective cover, and further wherein the protective cover extends downwardly and in a direction towards the lowermost end portion of the alarm/whistle, and further wherein the protective cover has a lowermost end portion of the protective cover that extends beyond and below the lowermost end portion of the alarm/whistle, and further wherein the vent alarm apparatus is a heating oil tank vent alarm, and further wherein the alarm/whistle generates a sound, an alarm noise or sound, or a whistle or whistling sound, when a heating oil is being introduced into, filled into, or delivered into, a heating oil tank, and further wherein the protective cover allows for an entry of the heating oil into the lowermost end portion of the protective cover, and further wherein the protective cover allows for a flowing of the heating oil in a direction towards the lowermost end portion of the alarm/whistle.

20. The vent alarm apparatus of claim 19, wherein the lowermost end portion of the protective cover is open and receives at least a portion of the heating oil introduced into, filled into, or delivered into, the heating oil tank.

* * * * *